Figure 1:
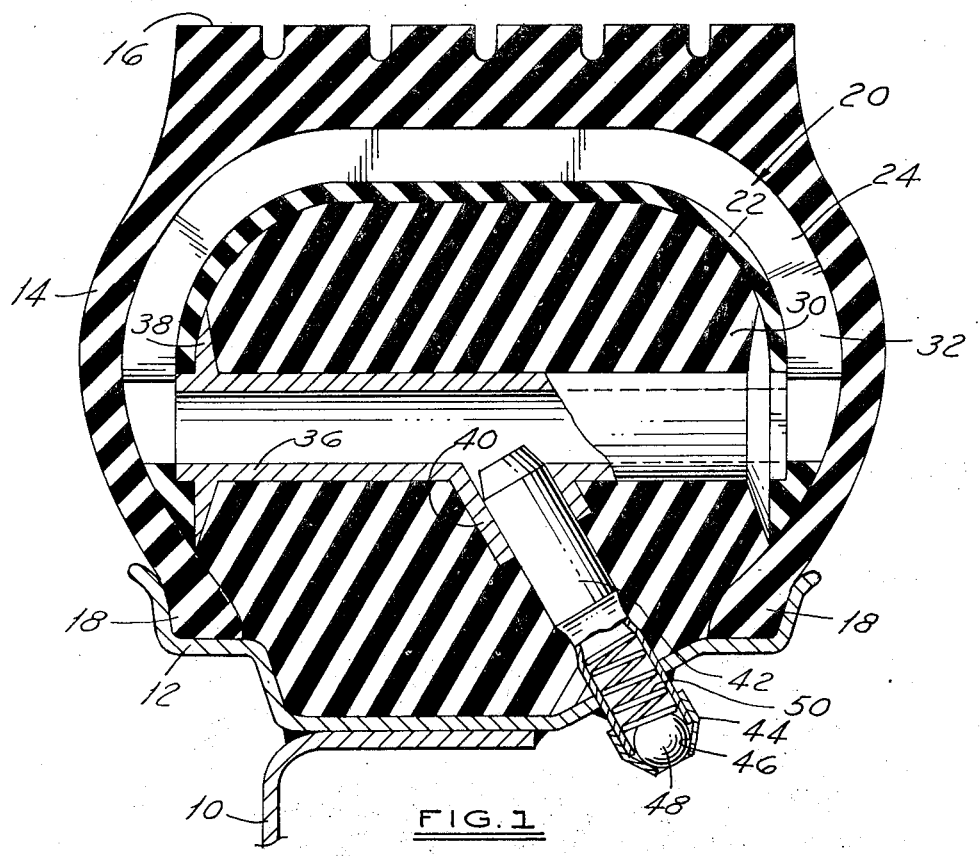

United States Patent [19]  
Sand, Sr.

[11] 3,804,144  
[45] Apr. 16, 1974

[54] TIRE CONSTRUCTION
[76] Inventor: Robert T. Sand, Sr., 5220 McClellan Ave., Detroit, Mich. 48213
[22] Filed: Aug. 17, 1972
[21] Appl. No.: 281,449

[52] U.S. Cl. ................. 152/313, 152/320, 152/328
[51] Int. Cl. .......................................... B60c 7/12
[58] Field of Search ........... 152/313, 312, 311, 320, 152/322, 325, 327, 328

[56] References Cited  
UNITED STATES PATENTS  
1,825,502  9/1931  Braza ................................ 152/320  
2,634,779  4/1953  Lambach ........................... 152/313  
1,841,773  1/1932  Worsley et al. .................... 152/328

Primary Examiner—James B. Marbert  
Attorney, Agent, or Firm—Barnes, Kisselle, Raisch & Choate

[57] ABSTRACT

A non-pneumatic tire comprising a tire casing and rim assembly with a relatively solid filler for the casing comprised of an annular resilient filler having transverse ribs extending around the outer surface and connected to air chambers adjacent the rim to allow air flow from the tread portion of the tire to the inside diameter areas to equalize temperatures. One embodiment includes segmental metal portions comprising part of the filler to support an outer annular resilient ribbed filler element.

7 Claims, 6 Drawing Figures

3,804,144

TIRE CONSTRUCTION

This invention relates to a tire construction and more particularly to a puncture-proof solid type tire which is so constructed that it will be adequately cooled to prevent destructive heat build-up.

One of the problems in the design of puncture-proof tires has been the problem of heat build-up as a result of the running on the pavement and the constant friction due to the movement of the material within the tire.

It is an object of the present invention to provide a tire construction which is relatively solid and yet which has sufficient cushioning ability that it will absorb the small bumps and irregularities of a pavement or road while yet being ventilated and cooled to the point that there will not be excessive heat build-up.

It is an object, therefore, to provide a relatively solid tire construction which has a cushioning function and utilizing the spaces that provide the cushioning also to circulate air to reduce the heat.

A further object is the utilization of a valve which will open under centrifugal force to allow a tire to breathe as it moves.

It is another object of the invention to provide adequate valve facilities for the intake and outlet of air which will also permit the removal of water which might accidentally enter the tire cavities.

A further object is the provision of a modification wherein the circumferential tire base can be assembled in segments around a wheel or within a tire casing.

Other objects and features of the invention will be apparent in the following description and claims in which is set forth the principles of the invention together with the best mode presently contemplated.

Figure 2:
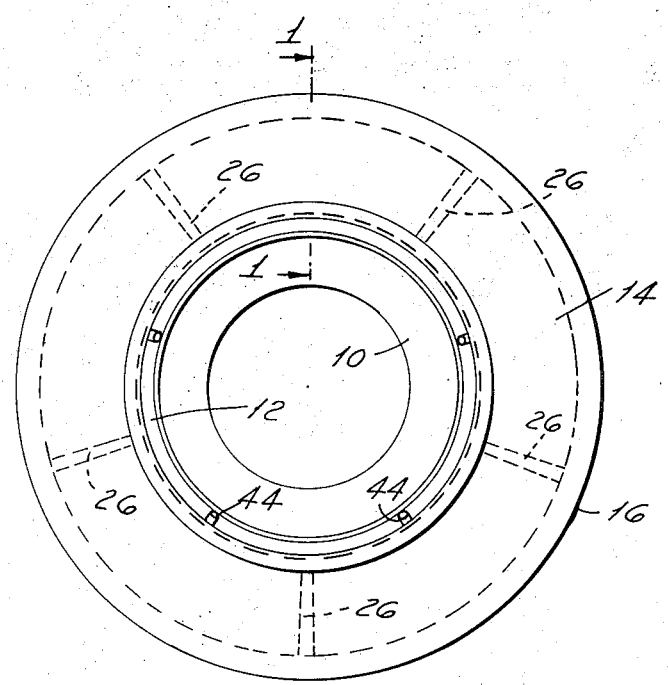

Drawings accompany the disclosure and the various views thereof may be briefly described as:

FIG. 1, a sectional view taken on line 1—1 of FIG. 2 showing cushioning and ventilating passages.

FIG. 2, a side elevation of a solid tire constructed in accordance with the invention.

Figure 3:
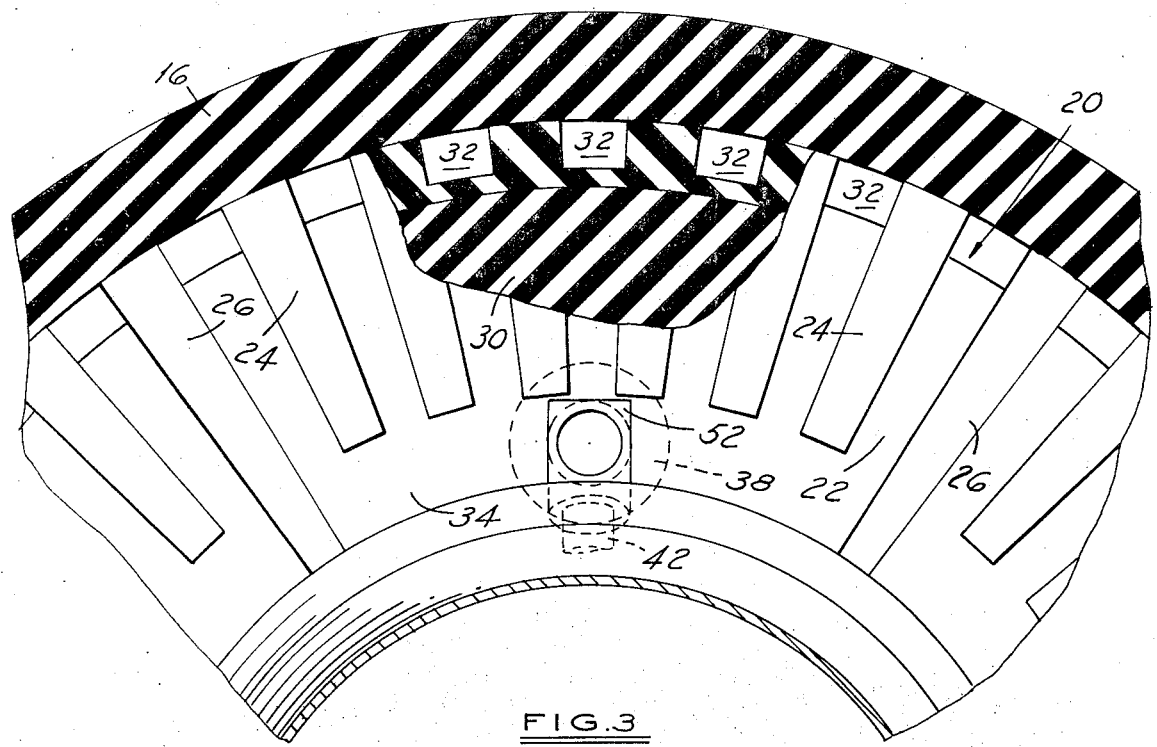

FIG. 3, a sectional view taken on a plane normal to the axis of the tire to illustrate the relative position of the parts.

Figure 4:
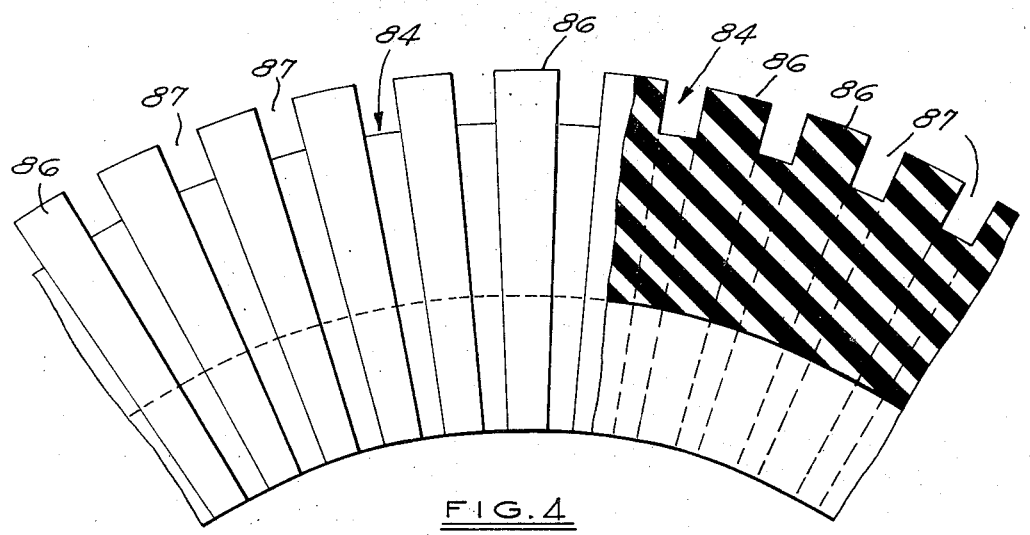
Figure 6:
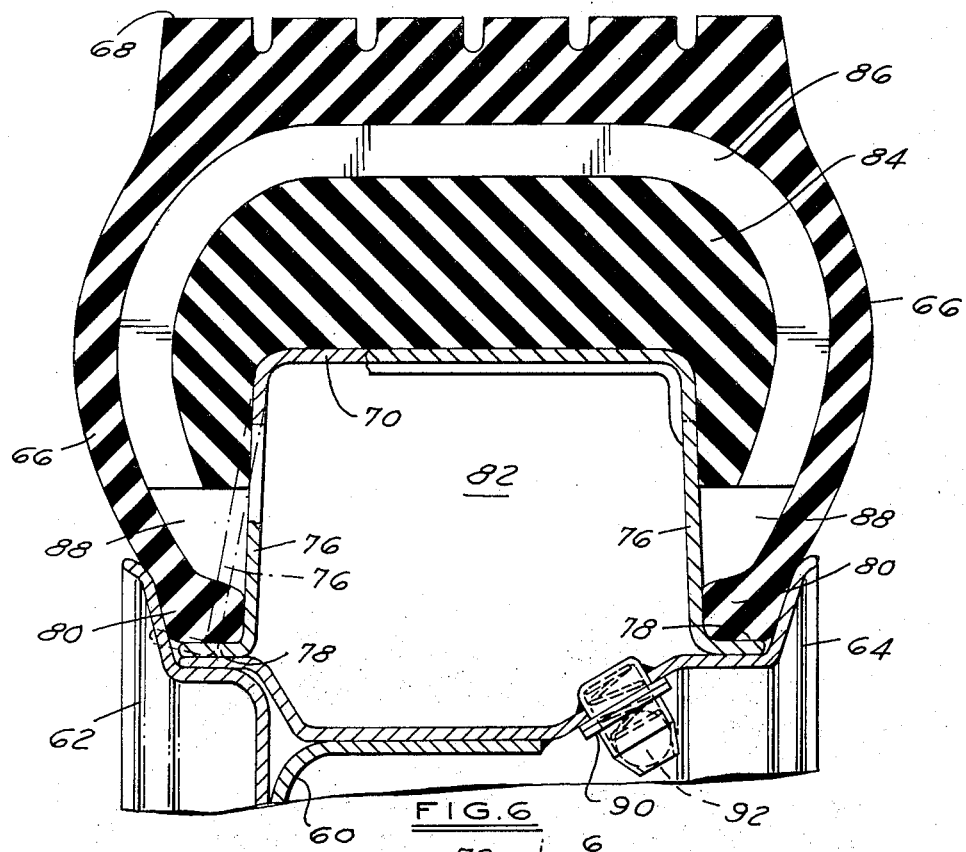
Figure 5:
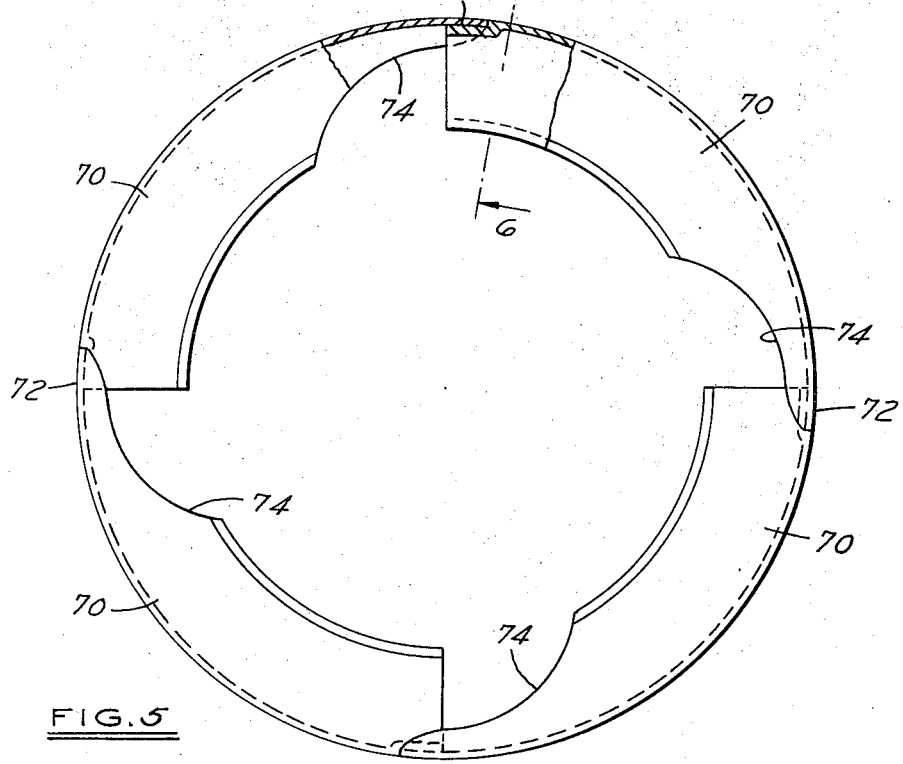

FIG. 4, a view of a tire core element utilized in the construction of FIGS. 5 and 6.

FIG. 5, a view of a tire modification wherein the core elements are constructed in a plurality of segments.

FIG. 6, a sectional view on line 6—6 of FIG. 5 showing the cross-section of the core element and also the cross-section of the assembled tire.

REFERRING TO THE DRAWINGS

In FIG. 1, a wheel disc 10 supports a flanged rim 12 of generally standard construction. A tire casing is assembled on this rim having side walls 14, a tread portion 16, and beads 18 which are held captive in the flanged portion of the rim. The tire is filled and supported by a two-piece filler element composed of an outer element shown in FIG. 3 which consists of a circumferentially closed element 20 having a circumferential body portion 22 semi-circular in cross-section with a plurality of circumferentially spaced solid transverse ribs 24 extending around the body portion from side to side.

It will be noted (FIGS. 2 and 3) that every seventh rib 26 extends inwardly beyond the remaining ribs 24 to provide segmental chambers in connection with the assembly to be described. This shell-like element 20 is mounted on a solid circular filler portion 30 formed of resilient rubber, synthetic, or plastic which has the inner diameter supported by the rim 12 and the outer diameter lying against the inner diameter of the shell portion 20. This assembly provides a series of annular passages 32 which lie under the bead portion 16 of the tire and extend to a segmental passage 34 (FIG. 3) lying between the extended ribs 26. A cross tube 36, having suitable end flanges 38, is mounted at circumferentially spaced points around the filler 30 to connect the ends of the annular passages 32 with each other and with the segmental passages 34.

This tube element has a branch opening 40 which receives the stem 42 of a vent valve having an exterior end 44 providing a valve seat 46 closed by a ball 48 backed by a spring 50. The exterior of the tube 36 preferably has a square end portion 52 to prevent turning. Thus, as shown in FIG. 2, the tire is divided into five segmental chambers, each of which has transverse annular passages 32 between the ribs 26 which connect with the segmental passage 34 which is open to atmosphere through the valve 48. In the event of any cooling of the air within the tire, the pressure less than atmosphere will be supplemented through the valve 48 when the spring 50 is overcome. In some instances, it may be desirable simply to have a restricted passage in the valve 42 to allow air to pump back and forth. However, the preferred structure, as illustrated in the drawings, utilizes a spring backed ball which at low speeds results in a closed valve condition. There is no heat problem at these speeds and should the wheel be passing through water or mud, the valve would prevent ingress of foreign matter. At speeds of about 25 or 30 miles per hour, the ball would be held open against the spring to permit free flow of air in and out of the valve stem to permit the tire to breathe and increase the cooling effect. The spring may be readily calibrated in relation to the weight of the ball to effect opening at a selected speed.

In the embodiments shown in FIGS. 4, 5 and 6, the support wheel 60 has side rim flanges 62 and 64, the flange 64 extending across the axial extent of the rim to provide the axial structural element of the wheel. A tire with the usual sidewalls 66 and a tread portion 68 is mounted on the rim and the filler portion for this tire is formed, first of all, by a plurality of metal segments 70 which are connected at the ends by the overlap joint portion 72. One end of each of the segments is reduced at 74 to facilitate assembly. The elements 70 have sidewalls 76 which, in the unassembled position, would be spread out as shown by the dotted line in FIG. 6. When assembled, these sidewalls 76 are compressed so that the bottom flanges 78 will lie within the rim edges 62 and 64 and inside the bead 80 of the tire shell. Thus, the assembled elements 70 provide a relatively large annular air chamber 82 outside the rim and inside the tire. A filler element 84 has a series of ribs 86 which provide transverse peripheral grooves 87 around the filler, these grooves terminating at an annular space 88 on each side of the tire which will be in communication with the chamber 82 through the reduced portion 74 and other openings if desired.

A small valve assembly 90 with a spring-backed ball 92 is provided to admit air into the annular chamber 72 in the event of a reduced inside pressure and also to allow free breathing to atmosphere at a selected speed as previously described. Thus, with the parts assembled as shown in FIG. 6, the operation of the tire is that the rolling pressure reduces the annular spaces 86 at the tread area forcing air into the inner passage 82 through the channels between the ribs 86. Air is thus constantly moving back and forth from the chamber 82 to the tread area to cool the entire tire. Valve 92 allows equalization of pressure due to atmospheric valves of unbalance due to excessive cooling but also allows constant breathing of the tire as it moves along the highway. The various irregularities in a road will cause the volume changes which result in air flow into and out of the tire.

It will thus be seen that there is provided in the two described embodiments a non-pneumatic tire which has air passages to provide resilience and also to provide an air flow interchange from one radial area of the tire to another to effect cooling and equalization of temperatures, thus preventing a high temperature build-up at the tread portions.

I claim:

1. A non-pneumatic tire for use with a supporting wheel comprising a casing having a tread portion and sidewalls formed of resilient material, and having an annular cavity, means filling said cavity to provide supportive load carrying strength to said casing, said means having a plurality of connecting passageways to provide air chambers within said casing extending from said tread portions toward said sidewalls, and a centrifugally responsive valve to open said connecting passageways to atmosphere at a selected speed of rotation of said tire.

2. A non-pneumatic tire as defined in claim 1 in which said valve comprises a hollow stem extending in a substantially radial direction having an outer end connected to said passageways and a valve seat at the inner end, a ball to seat against said seat, and a spring to hold said ball on said seat at speeds below said selected speeds.

3. A non-pneumatic tire for use with a standard rim and tire casing which comprises a filler element for a tire casing extending circumferentially throughout the annular cavity of the casing formed of resilient material and having transverse outer ribs which provide air passages from the tread portion of the tire to the rim bead portion to effect air flow and temperature equalization, the filler element comprising an outer shell section having external transverse ribs and an inner filler section extending from the inside diameter of the outer filler section to the outside diameter of the supporting rim, certain of said ribs ending short of said rim and certain of said ribs extending to the rim to divide the annular recesses of the tire into segmental compartments each connected to atmosphere, valve means to connect each of said segmental compartments to atmosphere, said valve means comprising tubular elements extending axially across said filler element to connect segmental side passages to each other, and valve means connected to said tubular elements extending to a point outside said tire and rim.

4. A non-pneumatic tire for use with a standard rim and tire casing which comprises a filler element for a tire casing extending circumferentially throughout the annular cavity of the casing formed of resilient material and having transverse outer ribs which provide air passages from the tread portion of the tire to the rim bead portion to effect air flow and temperature equalization, the filler element comprising an outer shell section having external transverse ribs and an inner filler section extending from the inside diameter of the outer filler section to the outside diameter of the supporting rim, certain of said ribs ending short of said rim and certain of said ribs extending to the rim to divide the annular recesses of the tire into segmental compartments each connected to atmosphere, valve means to connect each of said segmental compartments to atmosphere.

5. A non-pneumatic tire for use with a standard rim and tire casing which comprises a filler element for a tire casing extending circumferentially throughout the annular cavity of the casing formed of resilient material and having transverse outer ribs which provide air passages from the tread portion of the tire to the rim bead portion to effect air flow and temperature equalization, the filler element comprising an outer shell section having external transverse ribs and an inner filler section extending from the inside diameter of the outer filler section to the outside diameter of the supporting rim, certain of said ribs ending short of said rim and certain of said ribs extending to the rim to divide the annular recesses of the tire into segmental compartments each connected to atmosphere, valve means to connect each of said segmental compartments to atmosphere, and a centrifugally responsive valve to open each of said segmental compartments to atmosphere at a selected speed of rotation of said tire.

6. A non-pneumatic tire for use with a standard rim and tire casing which comprises a filler element for a tire casing extending circumferentially throughout the annular cavity of the casing formed of resilient material and having transverse outer ribs which provide air passages from the tread portion of the tire to the rim bead portion to effect air flow and temperature equalization, the filler element comprising a hollow, annular metallic support element having a base supported within the tire recess by side walls mounted on a supporting rim and a filler element between said base and the inner walls of said tire having transverse rib portions pneumatically connected to the recess within said base and side wall portions.

7. A non-pneumatic tire for use with a standard rim and tire casing which comprises a filler element for a tire casing extending circumferentially throughout the annular cavity of the casing formed of resilient material and having transverse outer ribs which provide air passages from the tread portion of the tire to the rim bead portion to effect air flow and temperature equalization, the filler element comprising a hollow, annular metallic support element having a base supported within the tire recess by side walls mounted on a supporting rim and a filler element between said base and the inner walls of said tire having transverse rib portions pneumatically connected to the recess within said base and side wall portions, said metallic support element being formed of a plurality of segments interfitted with each other to provide an annular structure.

* * * * *